(12) United States Patent
Fischer

(10) Patent No.: US 6,273,457 B1
(45) Date of Patent: Aug. 14, 2001

(54) SIDE GAS BAG RESTRAINT SYSTEM

(75) Inventor: Anton Fischer, Leinweiler (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/560,115

(22) Filed: Apr. 28, 2000

(30) Foreign Application Priority Data

Apr. 29, 1999 (DE) .......................................... 299 07 622 U

(51) Int. Cl.⁷ ............................ B60R 21/22; B60R 21/06
(52) U.S. Cl. ........................................ 280/730.2; 280/749
(58) Field of Search ............................ 280/730.2, 730.1, 280/749, 751, 743.1

(56) References Cited

U.S. PATENT DOCUMENTS

| | | | |
|---|---|---|---|
| 5,322,322 | * 6/1994 | Bark et al. | 280/730 |
| 5,439,247 | * 8/1995 | Kolb | 280/730.2 |
| 5,480,181 | * 1/1996 | Bark et al. | 280/730.2 |
| 5,588,672 | * 12/1996 | Karlow et al. | 280/730.2 |
| 5,788,270 | * 8/1998 | Haland et al. | 280/730.2 |
| 5,899,491 | * 5/1999 | Tschaeschke | 280/730.2 |
| 5,924,723 | * 7/1999 | Brantman et al. | 280/730.2 |
| 5,957,487 | * 9/1999 | Stutz | 280/730.2 |
| 6,000,715 | * 12/1999 | Tschaeschke | 280/730.2 |
| 6,073,961 | * 6/2000 | Bailey et al. | 280/730.2 |
| 6,082,761 | * 7/2000 | Kato et al. | 280/730.2 |
| 6,099,029 | * 8/2000 | Haland et al. | 280/730.2 |
| 6,116,644 | * 9/2000 | Viano et al. | 280/743.1 |

FOREIGN PATENT DOCUMENTS

| | | |
|---|---|---|
| 296 05 897 U | 9/1996 | (DE) . |
| 297 18 305 | 3/1998 | (DE) . |
| 298 02 507 U | 7/1998 | (DE) . |
| 0798173 | 3/1997 | (EP) . |
| 0816180 | 6/1997 | (EP) . |
| 2327066 | 1/1999 | (GB) . |

\* cited by examiner

*Primary Examiner*—Brian L. Johnson
*Assistant Examiner*—Joselynn Y. Sliteris
(74) *Attorney, Agent, or Firm*—Tarolli, Sundheim, Covell, Tummino & Szabo L.L.P.

(57) ABSTRACT

A side gas bag restraint system for protecting an occupant (9) in a vehicle has a seat with a back rest (21) and a side window (S). The system includes a gas bag (1) having a large area and covering at least a part of the side window (S) of the vehicle. The gas bag (1) has a non-inflatable section (37), at least one inflatable restraint chamber (23) that has an inflated state. The restraint chamber (23) is provided in front of and above the associated back rest (21) of the vehicle to restrain a head of the occupant (9). The gas bag (1) further has inflatable tensioning chambers (27, 29, 31). The restraint chamber (23) is connected with the tensioning chambers (27, 29, 31) that are connected in series with regard to gas flow and are arranged in succession along a lower edge (25) of the gas bag (1). The tensioning chambers (27, 29, 31) have constrictions (37) between them. The non-inflatable section (37) is tightened between the inflatable chambers (23, 27, 29, 31) and the vehicle when the gas bag (1) is inflated.

21 Claims, 1 Drawing Sheet

SIDE GAS BAG RESTRAINT SYSTEM

TECHNICAL FIELD

The invention relates to a side gas bag restraint system.

BACKGROUND OF THE INVENTION

A side gas bag restraint system known from DE 298 02 507 U1 shows a gas bag which has a taut, tubular gas bag section being spherical in the inflated state. This section forms an inflatable tensioning band, by means of which an additional chamber is available for the inflowing gas.

The aim is to form the area of the gas bag to be as large as possible for restraining the head and also the hands and to position the gas bag in the inflated state so as to be as stable as possible in the vehicle.

BRIEF SUMMARY OF THE INVENTION

The invention comes still closer to these aims than the prior art already known. This is achieved in a side gas bag restraint system for protecting occupants in motor vehicles having seats with a back rest and side windows by the system comprising a gas bag having a large area and covering at least a part of a side window of the vehicle. The gas bag has a non-inflatable section, at least one inflatable restraint chamber which is contacted by the head of the occupant in case of a side impact and which, in relation to an inflated state of the gas bag, is provided in front of and above an associated back rest of the vehicle to restrain a head of the occupant, and inflatable tensioning chambers. The inflatable restraint chamber is connected to a plurality of the inflatable tensioning chambers which are connected in series with regard to gas flow and are arranged in succession along a lower edge of the gas bag. The tensioning chambers have constrictions between them, and the non-inflatable section, constructed so as to have a large area, is tightened between the chambers and the vehicle when the gas bag is inflated.

The non-inflatable section connects all the chambers with each other and is fastened to the vehicle, preferably to the roof frame or to a vehicle column (A-, B- or C-column). Thereby it also connects all the chambers with regard to forces. The tensioning chambers which must not have a large volume compared with the restraint chamber, serve for the contraction in length of the gas bag principally in a horizontal direction. Furthermore, they also automatically lead to a specific contraction in length in a vertical direction. All the contraction forces occurring here are introduced into the vehicle via the non-inflatable section that has a large area. The non-inflatable section therefore substantially improves the positioning of the gas bag and is available as an additional restraint area. The numerous tensioning chambers arranged one behind the other and connected in series in terms of flow are at least partially inflated via the restraint chamber. When the head strikes onto the restraint chamber, high pressures occur in the latter. These are reduced by the gas being able to escape into the tensioning chambers. As the tensioning chambers have constrictions between them which act as throttle valves, a good damping effect is produced. The peak pressures are therefore decreased by gradual overflowing from tensioning chamber to tensioning chamber, as in a shock absorber.

Despite its stable positioning in the vehicle, the side gas bag restraint system according to the invention is also distinguished by a "soft" restraining of the head of the occupant. This is achieved by the combination of the restraint chamber, tensioning chambers connected with each other with regard to flow but having constrictions between them, and the non-inflatable section.

According to the preferred embodiment, the restraint chamber extends substantially from the roof frame vertically downwards to the lower edge of the gas bag. The inflation opening of the gas bag is connected directly with the restraint chamber, so that the latter is inflated before the tensioning chambers. Through this development, it is to be ensured that firstly the restraint chamber is available for restraining and no unnecessary delays can arise during inflating. As the restraint chamber runs substantially vertically downwards from the roof frame and the adjoining tensioning chambers run along the lower edge, all the chambers together as a whole form an "L". The remaining region of the associated side window with which the occupant's head may come into contact, is covered by the non-inflatable section.

In the inflated state of the gas bag, the inflatable tensioning chambers have substantially a spherical shape. This leads to as large a surface as possible and hence a great contraction in length.

The gas bag is preferably to be folded such and the flow connection of the chambers with each other is to be constructed such that an overflowing of gas from the restraint chamber into the tensioning chambers is only possible with a gas bag unfolded almost completely downwards. Thereby, even if the restraint chamber is not completely inflated, the gas bag is to be fully unfolded downwards and is to cover the side window before it pulls itself taut between its fastening points.

The damping effect, already previously explained, by means of the tensioning chambers is achieved, for example, in that the gas bag restraint system includes the gas generator itself, the inflated gas quantity, the volumes of the chambers, and their flow connection coordinated with each other such that at least one tensioning chamber is not fully inflated by the gas generator. The volume then still available in the tensioning chamber or chambers permits an overflowing of gas when the head strikes onto the restraint chamber.

DETAILED DESCRIPTION OF THE PREFERRED EMBODIMENT

Figure 1:
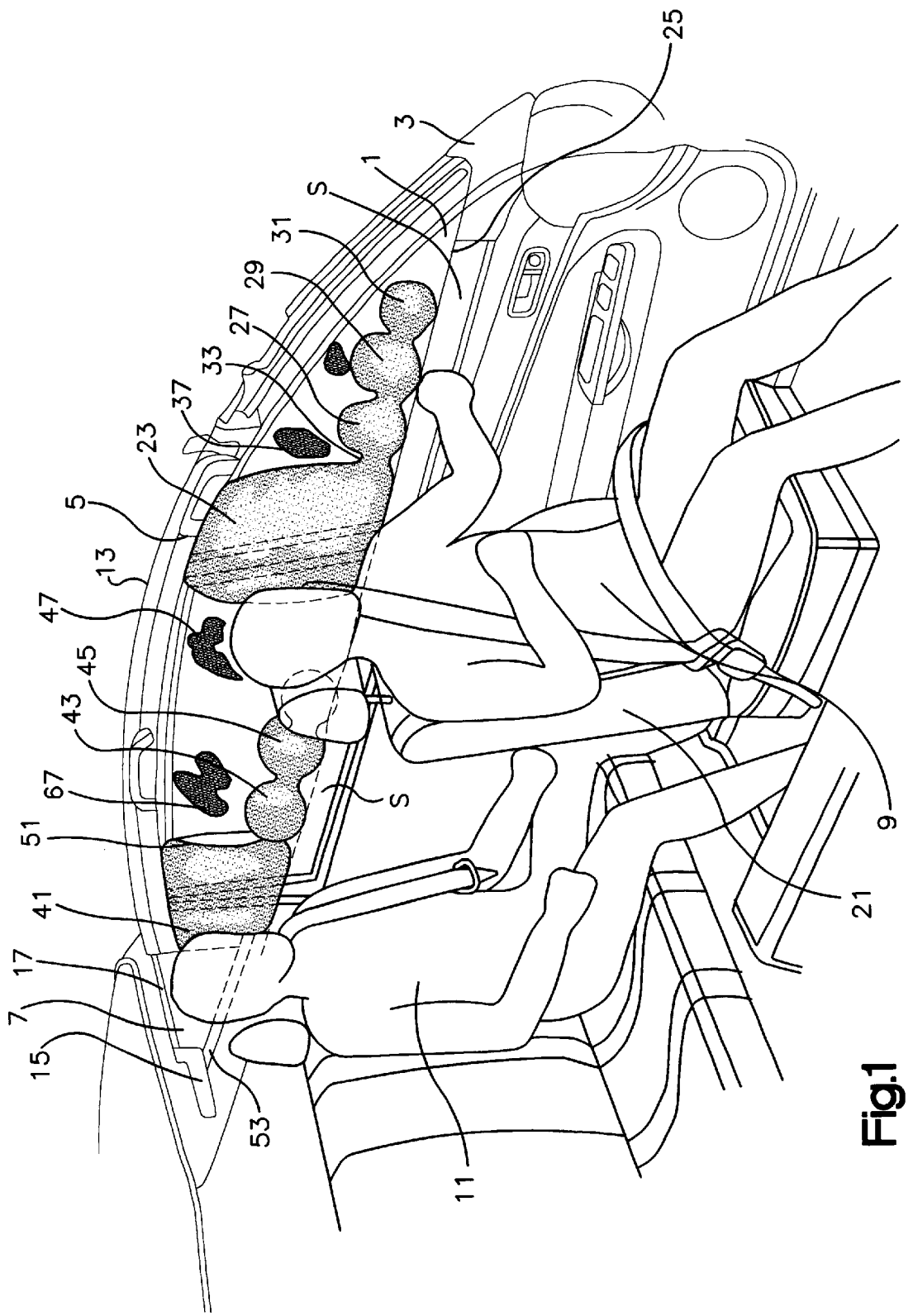
FIG. 1 shows a partial interior view of a vehicle with an incorporated side gas bag restraint system according to the invention, the gas bag being illustrated in an inflated state.

The side gas bag restraint system shown in FIG. 1 has a so-called ABC gas bag 1, which extends from the A-column 3 of the vehicle via the B-column 5 to the C-column 7 and is intended to cover both the side window S to the side of the front occupant 9 of the vehicle and also the side windows to the side of the rear occupant 11 on one side of the vehicle. The gas bag 1, which is thus constructed having a very large area, is accommodated in folded state behind the lining of the A-column 3 and of the roof frame 13. The respective side windows are concealed by the unfolded gas bag 1 and, thus, are not visible in the drawing. In the region of the C-column 7, still behind the head of the rear occupant, a gas generator 15 is arranged as part of the restraint system. A gas lance 17 connects the gas generator 15 with the interior of the gas bag 1. The gas lance 17 can terminate here at the rear end of the gas bag 1 or extend far into the interior of the gas bag 1, for example, up to the side of the head of the rear occupant 11 along the roof frame 13 and have outlet openings across its length.

The gas bag 1 is constructed in one piece by two fabric layers, lying opposite each other, being sewn or woven to each other. The gas bag 1 is to be constructed so as to be as gas-tight as possible, by having for example a coating or being of a correspondingly gas-tight textile fabric, so that its so-called service life in the inflated state is as long as possible.

The gas bag 1 has a plurality of non-inflatable sections and inflatable chambers which are explained hereinbelow firstly for the region to the side of the front occupant 9 and then for the region to the side of the rear occupant 11. Slightly in front of and above the back rest 21 of the front occupant 9, i.e., to the side of the head of the front occupant 9, the gas bag 1 has a first inflatable restraint chamber 23, which extends from the roof frame 13 as a wide band downwards to the lower edge 25 of the gas bag 1 and which has a cushion shape. The first inflatable restraint chamber 23 opens directly into an inflation opening. This inflation opening can be formed for example by numerous small openings of the gas lance 17 when it extends forward up to the first restraint chamber 23 along the roof frame 13. At the lower end of the first restraint chamber 23, the latter is connected in terms of flow with a plurality of so-called inflatable tensioning chambers 27, 29, 31 running along the lower edge 25 and connected in series in terms of flow. Between the first restraint chamber 23 and the first tensioning chamber 27, as seen in the direction of flow, a distinct constriction 33 is provided. Further constrictions which are not designated explicitly but are illustrated, are then present between the individual tensioning chambers 27, 29 and 31. The tensioning chambers 27, 29, 31, in the fully inflated state, have a spherical form. All the inflatable chambers 23, 27, 29, 31 are connected to each other by a non-inflatable section 37. The non-inflatable section 37, in the inflated state of the gas bag 1, covers those regions of the side window which are not already covered by the inflatable chambers 23, 27, 29, 31. The non-inflatable section 37 is fastened along the roof frame 13 and the A-column 3.

It can also be seen in FIG. 1 that the first restraint chamber 23 also covers the B-column 5, which represents a high risk of injury in a side impact.

The shape of that region of the gas bag 1 which serves to protect the rear occupant 11 is constructed in a similar manner to the section for the front occupant 9. Somewhat in front of and above the back rest of the rear occupant 11, i.e., to the side of the head of the occupant 11, the gas bag 1 has a second inflatable, cushion-shaped restraint chamber 41, which also runs from the roof frame 13 downwards to the lower edge 25. The second restraint chamber 41 covers a part of the side window and a part of the C-column 7. In terms of flow, a plurality of spherical tensioning chambers 43, 45, 47 also adjoin the second restraint chamber 41. The tensioning chambers 43, 45, 47 run towards the front along the lower edge 25 and are connected in series in terms of flow. A constriction between the second restraint chamber 41 and the first tensioning chamber 43 is designated by 51. At the lower end of the gas bag 1 on the rear side of the vehicle, a tensioning band 53 runs parallel to the lower edge 25 and connects the gas bag with the C-column 7.

The mode of operation of the side gas bag restraint system according to the invention is explained hereinbelow.

With a side impact to the vehicle or an overturn of the vehicle, the gas generator 15 is activated. The generated gas flows via the gas lance 17 into the gas bag 1, the gas firstly arriving via the inflation opening for the first restraint chamber 23 and a corresponding inflation opening for the second restraint chamber 41 into these chambers. The gas bag firstly unfolds downwards through the inflating of the restraint chambers 23, 41. Through the constrictions 33, 51 and their position quite close to the lower edge 25 of the gas bag 1, the restraint chambers 23, 41 are firstly inflated almost completely, until gas can finally arrive via the constrictions 33, 51 in succession into the tensioning chambers 27, 29, 31, 43, 45, 47. The inflating of these tensioning chambers does not delay the unfolding of the gas bag 1. The quantity of gas introduced by the gas generator 15 is coordinated with the volumes of the chambers and their flow connections (constrictions) such that at least one tensioning chamber is not fully inflated by the gas generator. The inflating of all remaining tensioning chambers is sufficient, however, for a distinct contraction (in the horizontal direction) in length of the gas bag to occur in the region of the lower edge 25. A contraction in length also occurs in vertical direction. The gas bag 1 is thereby tensioned along its lower edge 25 between its fastening points on the A-column 3 and the C-column 7. Furthermore, it is also tensioned, as stated, in the vertical direction, so that the non-inflatable sections 37 and 67 are likewise taut and serve as an additional restraint surface.

The constrictions between the individual chambers have a dual function by serving on the one hand for the spherical shape of the tensioning chambers and on the other hand as a throttle for the gas flowing into them.

When the head of the respective occupant strikes onto his associated restraint chamber 23 or 41, a high gas pressure occurs in the interior of the restraint chamber. In order to decrease these peak pressures, gas can arrive via the constrictions 33, 51 and the following constrictions gradually into the tensioning chambers, the quantity of gas escaping into the tensioning chambers of course not being allowed to be so great that a complete compressing of the gas bag and a contacting of the side window, of the B- or C-column is possible. An overflowing of gas is facilitated by the not completely inflated tensioning chamber or a plurality of not completely inflated tensioning chambers. The connection in series of the tensioning chambers with their constrictions between them acting as throttles brings about a gradual damping and a systematic decrease of the peak pressures when the impact of the occupant into the gas bag occurs. The constrictions can also have an ever-decreasing flow cross-section, so that for example the last tensioning chambers 31, 47 in the flow direction are least filled by the gas generator 15. Therefore, the peak pressure in the gas bag can be reduced slowly from tensioning chamber to tensioning chamber when the head strikes.

What is claimed is:

1. A side gas bag restraint system for protecting an occupant in a motor vehicle having a seat with a back rest and a side window, said system comprising:

a gas bag having a large area for covering at least a part of the side window of the vehicle, said gas bag comprising:
a non-inflatable section;
at least one inflatable restraint chamber having an inflated state located in front of and above the back rest of the motor vehicle to restrain a head of the occupant; and
inflatable tensioning chambers;
said restraint chamber being extendable substantially from a roof frame of the vehicle vertically downwards to a lower edge of said gas bag;
said inflatable tensioning chambers being connected with said restraint chamber of said gas bag by said non-inflatable section;

said inflatable tensioning chambers having a smaller extension in vertical direction than said restraint chamber;

said inflatable restraint chamber being connected with a plurality of said inflatable tensioning chambers, said inflatable tensioning chambers being connected in series with regard to gas flow and being arranged in succession along a lower edge of said gas bag, said tensioning chambers having constrictions between said tensioning chambers;

said non-inflatable section, constructed so as to have a large area, being tightened between said chambers and the vehicle when said gas bag is inflated.

2. The side gas bag restraint system according to claim 1 wherein said restraint chamber is provided with an inflation opening so that said restraint chamber is inflated before said tensioning chambers.

3. The side gas bag restraint system according to claim 1 wherein said tensioning chambers have a substantially spherical shape in said inflated state.

4. The side gas bag restraint system according to claim 1 wherein said non-inflatable section, in said inflated state of said gas bag, covers substantially the entire region of an associated side window not already covered by said inflatable chambers.

5. The side gas bag restraint system according to claim 1 wherein said gas bag is folded in such a manner to have a flow connection of said chambers constructed such that an overflow of gas from said restraint chamber into said tensioning chambers is only possible when said gas bag is almost completely unfolded in the downward direction.

6. A side gas bag restraint system for protecting an occupant in a motor vehicle having a seat with a back rest and side windows, said system comprising:

a gas bag having a large area for covering at least a part of the side window of the vehicle, said gas bag comprising:
  a non-inflatable section;
  at least one inflatable restraint chamber having an inflated state for providing said gas bag in front of and above the back rest of the vehicle to restrain a head of the occupant;
  inflatable tensioning chambers; and
  a gas generator;
  said inflatable tensioning chambers being connected with said at least one inflatable restraint chamber by said non-inflatable section;
  said at least one inflatable restraint chamber being connected with at least two of said inflatable tensioning chambers, said tensioning chambers being connected in series with regard to gas flow and being arranged in succession along a lower edge of said gas bag, said tensioning chambers having constrictions between tensioning chambers;
  said non-inflatable section, constructed so as to have a large area, being tightened between said chambers and the vehicle when said gas bag is inflated;
  a quantity of inflation gas from said gas generator, volumes of said chambers, and flow connections between said chambers being coordinated such that at least one tensioning chamber is not fully inflated by said gas generator during and immediately after actuation of said gas generator.

7. A side gas bag restraint system for protecting an occupant in a vehicle, the vehicle having a seat with a back rest and a side window, said system comprising a gas bag for covering at least a part of the side window of the vehicle, said gas bag including:

a non-inflatable section;
at least one inflatable restraint chamber having an inflated state, said restraint chamber being provided in front of and above the back rest to restrain a head of the occupant; and
inflatable tensioning chambers having constrictions between them,
  said restraint chamber being connected with said tensioning chambers, said tensioning chambers being connected in series with regard to gas flow and arranged in succession along a lower edge of said gas bag, said non-inflatable section being tightened between said restraint chamber and tensioning chambers when said gas bag is inflated.

8. The side gas bag restraint system as defined in claim 7 wherein said restraint chamber extends substantially vertically downward from a roof frame of the vehicle to said lower edge of said gas bag when said restraint chamber is in said inflated state, said restraint chamber having an inflation opening so that said restraint chamber is inflated before said tensioning chambers are inflated.

9. The side gas bag restraint system as defined in claim 7 wherein said tensioning chambers have a substantially spherical shape in said inflated state.

10. The side gas bag restraint system as defined in claim 7 wherein said non-inflatable section, in said inflated state, covers substantially an entire region of the side window that is not covered by both said restraint chamber and said tensioning chambers in said inflated state.

11. The side gas bag restraint system as defined in claim 7 wherein said non-inflatable section is adapted to be fastened to a roof frame of the vehicle.

12. The side gas bag restraint system as defined in claim 7 wherein said non-inflatable section is adapted to be fastened to a vehicle column of the vehicle.

13. The side gas bag restraint system as defined in claim 7 further including a gas generator for supplying a quantity of gas to said restraint chamber and said tensioning chambers upon actuation of said gas generator.

14. The side gas bag restraint system as defined in claim 13 wherein the quantity of gas from said gas generator, a volume of said restraint chamber, a volume of said tensioning chambers, and a size of said constrictions are coordinated such that at least one tensioning chamber is not fully inflated during and immediately after actuation of said gas generator.

15. The side gas bag restraint system as defined in claim 7 wherein said gas bag is adapted to extend from an A-column of the vehicle to a C-column of the vehicle.

16. The side gas bag restraint system as defined in claim 7 wherein said gas bag covers at least part of a second side window.

17. The side gas bag restraint system as defined in claim 7 wherein said restraint chamber and said tensioning chambers together form an L-shaped structure when the gas bag is in said inflated state.

18. The side gas bag restraint system as defined in claim 7 wherein said restraint chamber extends downward vertically from an upper part of the side window.

19. The side gas bag restraint system as defined in claim 18 wherein said tensioning chambers extend horizontally from said restraint chamber away from the back rest.

20. A side gas bag restraint system for protecting an occupant in a vehicle, the vehicle having a seat with a back rest and a side window, said system comprising a gas bag for covering at least a part of the side window of the vehicle, said gas bag including:

a non-inflatable section;

at least one inflatable restraint chamber having an inflated state, said restraint chamber being provided in front of and above the back rest to restrain a head of the occupant; and inflatable tensioning chambers having constrictions between them, said restraint chamber being connected with said tensioning chambers, said tensioning chambers being connected in series with regard to gas flow and arranged in succession, said non-inflatable section being tightened between said restraint and tensioning chambers when said gas bag is inflated, at least one of said tensioning chambers being not fully inflated during and immediately after inflation of said gas bag.

21. A side gas bag restraint system for protecting an occupant in a vehicle, the vehicle having a seat with a back rest and a side window, said system comprising a gas bag for covering at least a part of the side window of the vehicle, said gas bag including:

a non-inflatable section;

at least one inflatable restraint chamber having an inflated state, said restraint chamber being provided in front of and above the back rest to restrain a head of the occupant; and inflatable tensioning chambers having constrictions between them, said restraint chamber being connected with said tensioning chambers, said tensioning chambers being connected in series with regard to gas flow and arranged in succession, said non-inflatable section being tightened between said restraint and tensioning chambers when said gas bag is inflated, said non-inflatable section, in said inflated state, covering substantially an entire region of the side window that is not covered by both the restraint chamber and the tensioning chambers.

* * * * *